(12) United States Patent  
Varney

(10) Patent No.: US 10,371,600 B2
(45) Date of Patent: Aug. 6, 2019

(54) DIAGNOSIS OF THE CONDITION OF A PARTICLE FILTER

(71) Applicant: JAGUAR LAND ROVER LIMITED, Warwickshire (GB)

(72) Inventor: Brian Varney, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 868 days.

(21) Appl. No.: 14/730,589

(22) PCT Filed: Dec. 6, 2013

(86) PCT No.: PCT/EP2013/075797
§ 371 (c)(1),
(2) Date: Jun. 4, 2015

(87) PCT Pub. No.: WO2014/090701
PCT Pub. Date: Jun. 19, 2014

(65) Prior Publication Data
US 2015/0369700 A1 Dec. 24, 2015

(30) Foreign Application Priority Data

Dec. 10, 2012 (GB) .................................. 1222176.8

(51) Int. Cl.
*G01M 15/10* (2006.01)
*F01N 11/00* (2006.01)
*F01N 3/021* (2006.01)

(52) U.S. Cl.
CPC .......... *G01M 15/106* (2013.01); *F01N 3/021* (2013.01); *F01N 11/00* (2013.01); *F01N 11/002* (2013.01);

(Continued)

(58) Field of Classification Search
CPC ........................................................ F01N 3/21
(Continued)

(56) References Cited

U.S. PATENT DOCUMENTS

| 5,732,551 A | 3/1998 | Naber et al. |
| 5,949,918 A * | 9/1999 | McCaffrey .............. G06T 5/009 382/274 |

(Continued)

FOREIGN PATENT DOCUMENTS

| EP | 2261474 A1 | 12/2010 |
| EP | 2444608 A1 | 4/2012 |
| WO | 2009024702 A1 | 2/2009 |

OTHER PUBLICATIONS

Combined Search and Examination Report under Sections 17 and 18(3) for Application No. GB1222176.8 dated Apr. 10, 2013.

(Continued)

*Primary Examiner* — Sujoy K Kundu
*Assistant Examiner* — Brent A. Fairbanks

(57) ABSTRACT

An on-board diagnostic for a particle filter of a vehicle exhaust system records repeating data about flow and pressure around the particle filter. Data is recorded in virtual data bins having successive thresholds or filters within a numerical scale. Each data point is typically recorded in several bins to permit a rapid calculation of averaged data for use in the diagnostic. Sensitivity of less frequently recorded data is preserved, while giving quickly delivery of a result from the diagnostic.

23 Claims, 2 Drawing Sheets

(52) U.S. Cl.
CPC ...... *F01N 2550/04* (2013.01); *F01N 2560/08* (2013.01); *F01N 2900/0404* (2013.01); *F01N 2900/1406* (2013.01); *F01N 2900/1606* (2013.01); *Y02T 10/20* (2013.01); *Y02T 10/47* (2013.01)

(58) Field of Classification Search
USPC .......... 702/179, 183, 198; 318/109; 707/687
See application file for complete search history.

(56) References Cited

U.S. PATENT DOCUMENTS

| | | | |
|---|---|---|---|
| 2004/0090195 A1* | 5/2004 | Motsenbocker | B63B 43/18 318/109 |
| 2005/0150220 A1* | 7/2005 | Johnson | F01N 3/025 60/295 |
| 2007/0032726 A1* | 2/2007 | Osaka | A61B 5/0048 600/459 |
| 2009/0211337 A1 | 8/2009 | Masuda et al. | |
| 2010/0114838 A1* | 5/2010 | Pirtle | G06Q 10/06 707/687 |
| 2012/0124967 A1 | 5/2012 | Yang et al. | |

OTHER PUBLICATIONS

International Search Report for International application No. PCT/EP2013/075797 dated Mar. 11, 2014.

* cited by examiner

DIAGNOSIS OF THE CONDITION OF A PARTICLE FILTER

TECHNICAL FIELD

This invention relates to a method of diagnosis, in particular a method of determining whether the behaviour or condition of apparatus is indicative of normal or faulty operation. The invention is applicable to a diagnostic which is required to rapidly deliver a result in a short period of time, in particular an on-board diagnostic (OBD). The invention also relates to an on-board diagnostic of a vehicle typically implemented in an electronic processor, to a system incorporating the diagnostic, and to a vehicle incorporating the system. Aspects of the invention relate to a method, to a system and to a vehicle.

BACKGROUND

Legislation prescribes certain standards. In particular legislation may prescribe the time period within which a diagnostic is required to generate a result, which may typically be a YES/NO or NORMAL/FAULT indication.

In order for example to reduce particle emissions of diesel engined vehicles it is common to provide a diesel particle filter (DPF) in the exhaust tailpipe. It may soon also become common to provide a gasoline particle filter (GPF) in the tailpipe of gasoline engine vehicles.

Legislation prescribes that an OBD be provided to confirm that exhaust emission controls are functioning correctly. One such OBD requirement relates to gross failure of the DPF, and is intended to indicate whether the DPF is wholly or partially missing from the exhaust system. Typically this OBD will detect a failure, and illuminate a malfunction illumination lamp (MIL) on the vehicle dashboard, so as to alert the vehicle driver that investigation and/or repair is necessary.

If the OBD is not effective, untreated exhaust emissions may pass to the exhaust tailpipe outlet.

Another area where a rapid result is required from an OBD is in relation to the correct working of safety functions. For example one mode of failure of a rotating component may generally be predicted from detecting an increase in vibration. Just prior to failure, the amplitude of a vibration may increase very rapidly, and a corresponding OBD may be required to deliver a very rapid result in order to detect and identify an imminent failure.

Yet another instance relates to rapid decision making based on data of variable quality, in particular where the accuracy of data recognition is dependent upon, for example, the distance of the measured parameter from a sensor of the measured parameter.

The following is an example of the importance of rapid decision making in relation to an OBD for a vehicle exhaust system.

A characteristic of known OBDs for determining whether a DPF has failed is that they use the measured differential pressure across the DPF as an input. The differential pressure varies in proportion with the magnitude of the gas flow through the DPF and the magnitude of the differential pressure value, the accuracy of the data and the opportunity to identify DPF failures are all at their greatest at high gas flows.

This differential pressure is continuously sampled and converted into an electrical signal. Very typically the electrical signal is noisy, and this noise may show considerable amplitude notwithstanding that the instant condition of a DPF may be substantially unchanging. Electrical noise is due to many factors, such as for example vehicle vibration.

Similarly there may be a great deal of noise on any values calculated by combination of the differential pressure with other appropriate engine or exhaust signals (for example a combined metric comprising differential pressure and volumetric flow rate) due to different response times between the various signals.

A standard technique for reducing such noise in the electrical or calculated signals is to use a substantial low pass filter, either by direct application of an electrical device on the electrical signal line or by application of appropriate digital signal processing within an engine management system; to produce heavily damped signal which will eliminate outliers. The heavily damped differential pressure signal or other calculated signals may then be tested against a threshold to indicate pass or fail.

However such techniques are undiscerning in their application of the filter, giving equal precedence to low accuracy data recorded at low levels of exhaust gas flows and high accuracy data recorded at high gas flows. As such the overall accuracy of the data delivered and judgements made on it will inevitably be compromised.

Another OBD may, in place of the filters, use data from a predetermined time period, and calculate an average from many measured values. These average values may then be combined to produce a signal which is then tested against a threshold to indicate pass or fail. However this method is subject to the same problem exhibited by the low pass filter technique, in that the accuracy of the high quality data recorded at high exhaust gas flows will be compromised by combination with low quality data recorded at low gas flows.

The application of severe entry conditions such that these known OBDs can only operate when presented with high levels of exhaust gas flow, can effectively obviate this issue, ensuring that the OBDs will only operate with high flow/high accuracy data. However for many vehicles types and customer usage profiles these periods of high exhaust gas flow occur infrequently and for very brief periods such as during periods of high vehicle acceleration. As such, the use of such entry conditions may, for many vehicles and customers, prevent these known OBDs from operating with sufficient frequency to achieve legislative operational requirements.

Similar problems can be identified in relation to data of variable accuracy related to other devices or apparatus. For example in relation to vibration of a rotating shaft, the quality of a sensor signal may be affected by noise from other sources of vibration (for example a motor or engine) such that a reliable judgement can be made for low speed data only after a significant quantity of data has been filtered or averaged according to known techniques. On the other hand high speed data may be considered to be a high quality if free from ambient influences, and accordingly a small data set may give a reliable diagnosis.

What is required is a diagnostic able to distinguish and use data of varying levels of accuracy; able to deliver both rapid judgements on data of variable accuracy, and also by ensuring that the accuracy of the best quality data is not compromised, able to subsequently deliver additional better quality judgements as and when sufficient high accuracy data becomes available during a given operational cycle.

SUMMARY OF THE INVENTION

According to an aspect of the invention there is provided a method of determining the condition of a component by period diagnostic check, said diagnostic check indicating behaviour corresponding to 'normal' and 'fault' by reference to one or more pre-determined values, the method comprising:

providing a numerical scale of possible values for each of one or more variable parameters of a component, said values have progressively increasing quality from one end of said scale to the other end;

defining in each said scale a plurality of successive thresholds or filters, and providing for each threshold or filter a virtual data bin;

continually measuring said one or more variable parameters at a pre-determined time interval to obtain successive values of said parameters;

for each successive value, placing the value in every corresponding data bin having a threshold or filter on the lower quality side of said value;

continually summing the values in respective data bins;

defining for every data bin a trigger limit corresponding to a maximum sum of values;

upon reaching the trigger limit in any bin, calculating the average value in said bin;

using said average value in said diagnostic check by reference to said pre-determined value, and clearing the bin in which the trigger limit was reached for re-accumulation of successive values.

In this document the term 'data bin' represents a suitable accumulator of data which meets a pre-defined target; upon reaching a trigger value the data in a data bin is averaged to indicate an outcome. Each data bin may accumulate upon reaching a threshold or upon passing a filter (for example a digital filter) whereby only data falling within defined and overlapping thresholds is considered to be of use.

The data may have a discrete value permitting it to be assigned to one or more data bins, according to the prescribed thresholds. In one embodiment the method is applied to a vehicle component for which a rapid OBD result is required and where data is of variable quality.

In one embodiment the numerical scale is such that the data with greatest accuracy, and thus the opportunity to discern component failure, is towards the higher magnitude end of the scale; accordingly each successive value is placed in every data bin having a threshold below the value.

The effect of the invention is to provide a diagnostic better able to give early indication of a component, for example failure of a DPF or GPF whereby untreated exhaust emissions may be exhausted from the vehicle engine in contravention of a legislative limit.

In an embodiment, the invention provides refined data for use in a diagnostic, for example a vehicle OBD for the purpose of indicating the condition of apparatus of the vehicle, in particular a DPF or GPF.

The invention is directly applicable to a method of determining the condition of a particle filter in the exhaust system of a vehicle in which the variable parameter is one of differential pressure across the particle filter, volumetric flow rate of the gas flowing through the filter, and dynamic head of the gas flowing through the filter, in use.

In the case of the variable parameter being differential pressure, the higher differential pressures are indicative of data of increased quality, and such data may be considered to progressively increase in quality as the differential pressure increases. By increased 'quality' we mean that the data tends towards increased reliability and/or increased value for the purposes of determining the condition of the component in question, for example a particle filter of an exhaust system.

The numerical scale comprises a sufficient number of thresholds to allow data to be distinguished, but not so many that an unreasonable processing capacity is required. Thus the lowest and/or the highest thresholds may define all data below or above a threshold, and corresponding absolute limits may not apply. Between the lowest and highest thresholds, a plurality of further thresholds define bands bounded by an upper and lower value. In practice the thresholds are arranged to ensure that the respective trigger limit is reached neither too quickly nor too slowly, having regard to the frequency with which the condition of the vehicle component is to be assessed. The number of thresholds or data bins may be more than 3 and less than 20.

The trigger limit may be the same for each bin, or for a plurality of bins, or may be individually selected.

In an embodiment of the invention the data with lowest magnitude is of greatest accuracy, and thus offers greatest opportunity to discern component failure; in this case the functionality is modified such that each successive value is placed in every corresponding bin having threshold above the value, and the numerical scale, thresholds and trigger limits are specified in the manner noted above.

In one embodiment, upon reaching the trigger limit in any bin, the average value is calculated in all corresponding bins of all said variable parameters.

The use of a plurality of data bins to sum the values of each variable parameter, and the simultaneous filling thereof, permits a trigger limit to be reached and a pass or fail judgement made, relatively rapidly in the period after commencing the diagnostic, on data of relatively lower quality and accuracy, by bins near one end of the scale. However simultaneously only the rarely seen but high quality data will be used to fill bins towards the other end of the numerical scale, and as sufficient data becomes available, further better quality pass or fail judgements may be made in the same period, for example a vehicle drive cycle, maximising the opportunity to detect failed components.

In a vehicle, an 'ignition on' event comprises a full engine stop and restart, typically as a vehicle driver exits the vehicle for a period. It is envisaged that temporary stopping of the engine, whilst the driver remains in the vehicle, may not re-start the time period during which the diagnostic accumulates data.

In an embodiment of the invention applied to a vehicle, all data accumulated in all said bins is cleared at each 'ignition off' event; that is to say, at each permanent stopping of the vehicle engine. An 'ignition off' event is exemplified by the vehicle driver leaving and locking the vehicle. This arrangement eliminates a requirement to hold data in a memory between individual periods of vehicle use, which substantially simplifies data handling. Retaining data is of lesser importance in the invention, because a relatively rapid determination of condition of the vehicle component can be made.

In one example, the invention is applied to an OBD for determining the condition of a particle filter (DPF or GPF) in the exhaust system of an internal combustion engine, and in particular to accumulate values of differential pressure between the inlet and outlet of such a filter. Differential pressure will tend to change very slowly over time when the DPF is partly full, but will tend to change very rapidly in the period immediately following a regeneration. Accordingly the respective trigger limit can be selected to give an appropriate speed of response according to the quantity and quality of data which is expected to be accumulated.

According to an aspect of the invention there is provided a method of determining the condition of a component by period diagnostic check, said diagnostic check indicating behaviour corresponding to 'normal' and 'fault' by reference to one or more pre-determined values, the method comprising: providing a numerical scale of possible values for each of one or more variable parameters of a component, said values have progressively increasing quality from one end of said scale to the other end; defining in each said scale a plurality of successive thresholds, and providing for each threshold a digital filter; continually measuring said one or more variable parameters at a pre-determined time interval to obtain successive values of said parameters; for each successive value, passing the value through a digital filter having a threshold on the lower quality side of said value; and using the output of said digital filter in said diagnostic check by reference to said pre-determined value.

In this aspect a plurality of digital filters replaces the plurality of data bins, but the raw data continues to be segregated by application of thresholds in order to separate data according to quality thereof. In one embodiment the segregated data is passed through every filter having an associated threshold on the lower quality side of the respective value.

Thus in both embodiments all data, which may be of variable quality, is used with high application of averaging or filtering. Better quality data is segregated, so that quality of data is not compromised by prior art averaging techniques. The invention allows the best quality fault value to be returned in the best time.

The invention may be embodied in a management system, for example in a vehicle management system or a vehicle engine system in any convenient or suitable manner. For example the invention may be implemented in a suitably programmed electronic processor having a memory and comprise an OBD routine. In a vehicle, the OBD may be fixed, or may include settable variables to take account of geographical location, vehicle usage, vehicle age, vehicle annual mileage or the like. Such settable variables may be set in a factory according to vehicle and/or engine type, and one or more settable variables may be set by a suitably authorised and trained technician.

The invention may be embodied in any suitable vehicle system, and the invention encompasses a vehicle engine having a control system for performing the invention, and a vehicle adapted to implement the invention.

One embodiment of the invention comprises a vehicle having an engine, an exhaust system, a particle filter in the exhaust system and an OBD for determining the condition of the particle filter by reference to continual measurements of differential pressure across the particle filter.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to an embodiment shown by way of example only in the accompanying drawings, in which.

DETAILED DESCRIPTION

Figure 1:
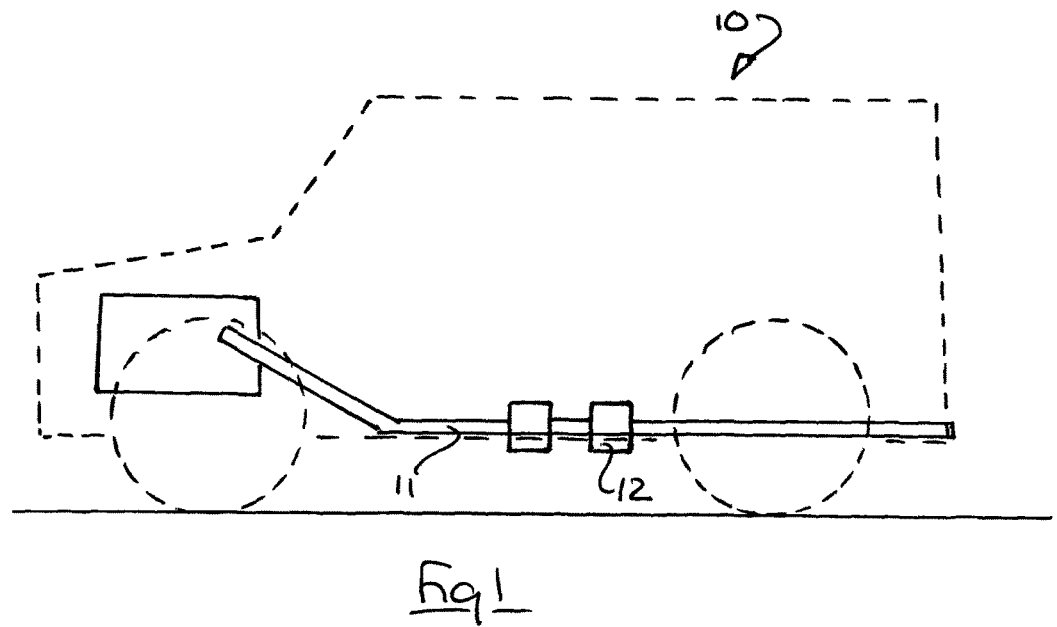
FIG. 1 shows schematically a vehicle having an exhaust system and an exhaust particle filter.

A typical combustion engined vehicle 10 has an exhaust system 11 including an exhaust particle filter 12 as one of several components thereof. The location of the exhaust particle filter 12 is illustrative in FIG. 1, and in practice may be close to the exhaust manifold or outlet of the usual turbocharger.

The function of the particle filter 12 is to remove soot particles from the exhaust gas stream by trapping them in a suitable filter monolith. A particle filter may be replaced when it is blocked sufficiently to cause a significant restriction to exhaust gas flow, but more usually a strategy is devised by which the accumulated particles are combusted. After combustion (usually termed regeneration) the filter is clean and capable of a further period of service. Several methods of regeneration are known, for example by raising the temperature of the exhaust gas stream to initiate spontaneous combustion.

In a vehicle having an exhaust particle filter, the vehicle electronic control system includes a number of on-board diagnostic (OBD) routines to periodically determine correct operation of a vehicle component. One such OBD is for determining whether an exhaust particle has failed by loss of filter material, and thus exhibits a reduction in the pressure difference across the filter.

Fortunately pressure difference is relatively easy to calculate, and suitable pressure sensors are provided at the inlet and outlet of the particle filter for sending analogue electrical signals to a vehicle or engine control system.

Differential pressure may be plotted graphically against gas flow in order to give an indication of whether a particle filter is 'normal' or 'faulty'. Gas flow can be determined from engine management data, for example from a look-up table relating engine speed, fuel flow, air flow and other relevant factors as determined from empirical testing of the vehicle engine. Such data is used in engine management systems, typically electronic control systems, and is supplied from suitable sensors and/or calculated in a suitable electronic processor. Such data may be stored in a memory for reference purposes.

Figure 2:
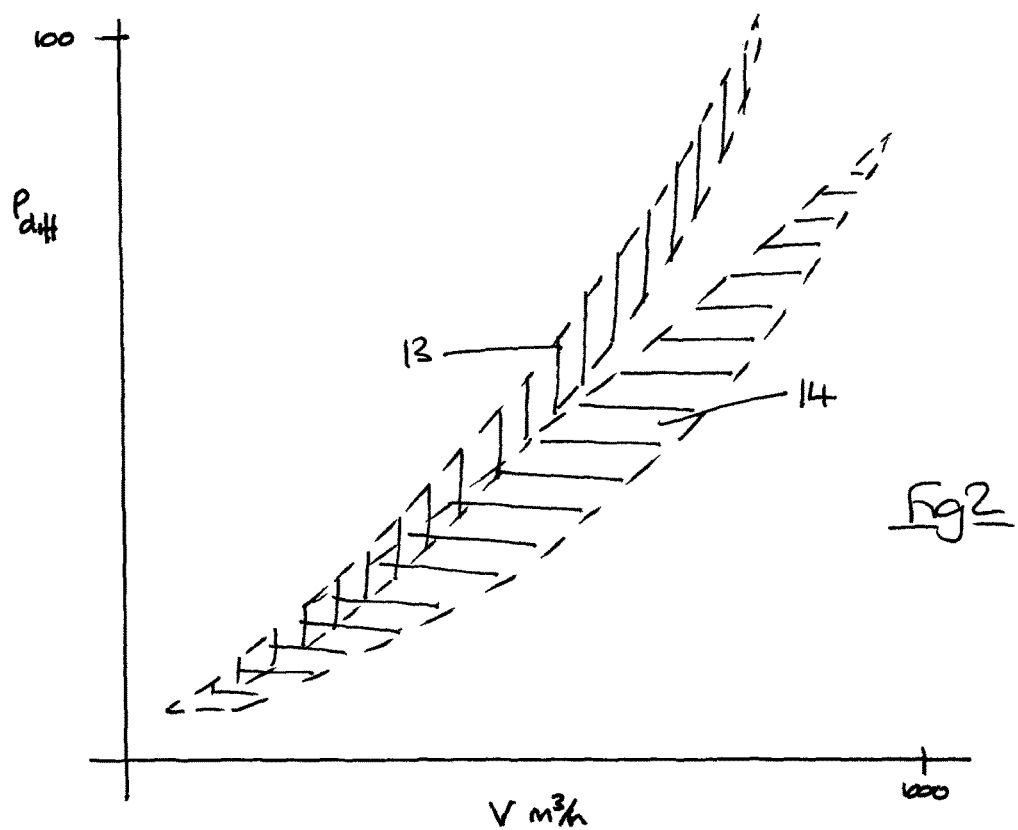
FIG. 2 shows graphically the spread of pressure differential/flow rate data, for an exhaust particle filter in normal and failed condition.

FIG. 2 illustrates graphically a typical graphical plot showing two overlapping sets of data, relating to a normal particle filter 13 and a faulty particle filter 14. The sets of data comprise a plurality of individual point measurements.

As will be readily appreciated, due to the presence of trapped soot within the particle filter these data sets overlap somewhat so that at some flow rates it is not possible to distinguish normal from fault, because a partially blocked normal filter may give the same pressure differential as a blocked filter with missing filter matrix. Furthermore the scatter of data within each data set is considerable, due typically to vehicle vibration and like effects. Such scatter is conventionally termed 'noise'.

Simple electronic filtering of data, to eliminate outliers and produce a linear relationship, is undesirable in particle filter monitoring because the differential pressure signal is most useful at high engine loads, which are relatively brief. Accordingly such high load data may be seen as transient, with the consequent risk of elimination by electronic filtering. In particle filter monitoring, high load data is valuable, and accordingly a technique of eliminating outliers is not acceptable.

In an OBD sufficient data must be accumulated to ensure that the result of the OBD is reliable. Accordingly, a plurality of data points are generally averaged. A particular problem with a particle filter is that sufficient data must be accumulated as quickly as possible after a regeneration event because the condition of the particle filter changes rapidly as soot particles are trapped. It cannot be guaranteed that the valuable high load data will be available following a regeneration event, but if available such data should be acted upon quickly. An averaging technique will tend to subsume valuable high load data within a much larger quantity of low load data, so that the effect of high load data is diluted.

A practical regeneration strategy relies upon occasional highway driving, in which exhaust gas temperature is sufficiently high to initiate a regeneration event when required. If however a vehicle is used only in town driving, the exhaust gas temperature may never reach the minimum necessary to initiate regeneration.

The invention is illustrated by reference to FIG. 3, which illustrates schematically a plurality of virtual data bins contained with the vehicle electronic control system, for example within a processor associated with an OBD for an exhaust particle filter.

Gas flow through the exhaust system is calculated continually at a suitable rate, for example 10 Hz, and corresponding measurements of differential pressure across the particle filter are recorded.

Figure 3:
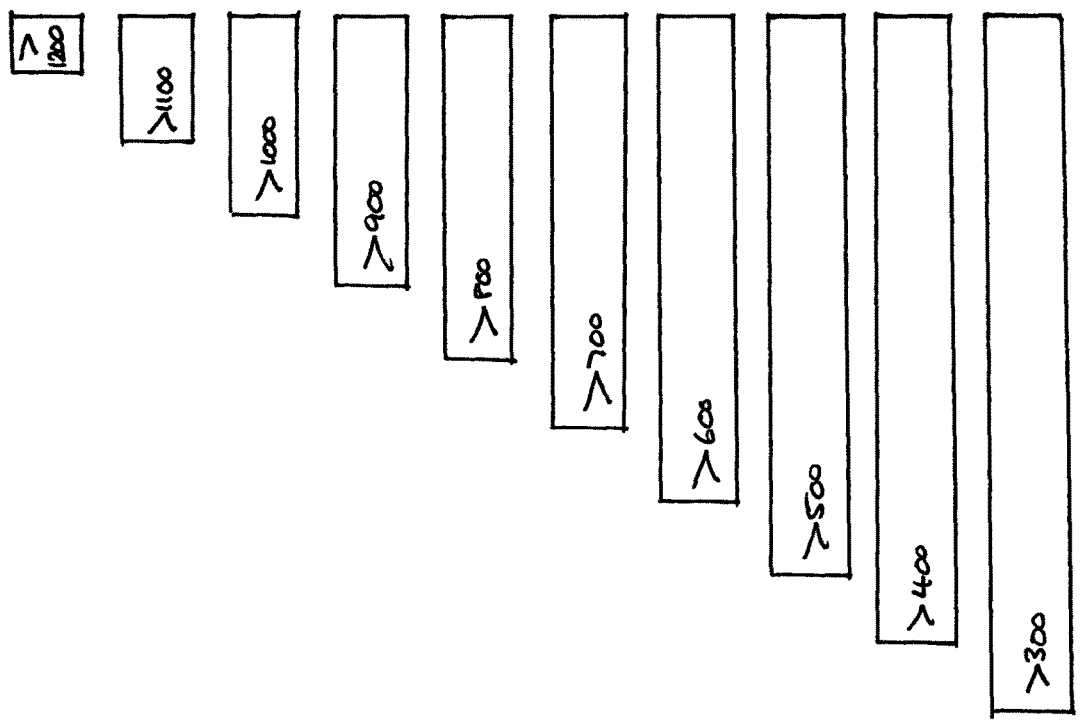
FIG. 3 shows schematically a plurality of data bins for use in an aspect of the invention.

For each data point, representing a gas flow and differential pressure, the virtual data bins of FIG. 3 are filled.

Each data bin represents a range of volume flow, being greater than a lower threshold which increases for each bin; thus as illustrated the lowest flow bin is for data associated with flow exceeding 300 $m^3/h$, and the highest is for data associated with flow exceeding 1200 $m^3/h$.

The number of data bins, and the respective ranges and lower thresholds can be selected according to requirements. There should be a sufficient number of bins to allow the invention to be realised, but not so many bins that data handling becomes resource hungry.

The data bins are provided in a memory or storage region of an electronic processor, which may in turn be part of a control system of a vehicle engine or of a vehicle. Data is assigned to bins according to a pre-programmed or embedded routine in the processor, or according to a suitable algorithm.

It will be readily understood that the lowest flow data bins will tend to fill frequently because high flow rate is associated with high engine speeds, which tend to be less frequent.

In this embodiment pressure differential data is placed in one or more bins according to the flow rate. Thus a recorded flow of for example 450 $m^3/h$ will cause the lower two bins to fill, whereas a flow of 880 $m^3/h$ will cause the lower six bins to fill.

Data thus accumulates in several bins simultaneously, allowing quick delivery of OBD results which rely, for reasons of confidence, upon an average of several data points, according to a trigger limit associated with each data bin. Thus although data is averaged, the band of data used for each average is restricted.

The respective bin trigger limit is associated with a volume limit, so that in one example the >400 $m^3/h$ bin may have a numerical limit of 10,000 $m^3/h$, and this limit may be reached when a number of data points have been recorded. The data in this bin could correspond to any flow rate in the range 400-500 $m^3/h$, and many recorded values could be 500 $m^3/h$ since the actual flow rate would be higher than 500 $m^3/h$.

In an example, 23 data points may cause the 10000 $m^3/h$ trigger limit to be exceeded. Once this trigger limit is exceeded, the average volumetric flow rate is calculated, being in one example 10040/23=437 $m^3/h$.

The data points also represent differential pressure, which is averaged in the same way to give an average differential pressure corresponding to the average flow rate. The OBD may also take account of dynamic head (the pressure differential due to flow through the particle filter), which may be calculated from engine management information and test bed data recorded in an appropriate look-up table or defined by an appropriate algorithm in an electronic control unit of the engine or vehicle. Dynamic head can be represented as data points, and recorded in data bins in the same manner as differential pressure, in order to generate an averaged value for each band on measurement.

Data collected in this way will tend to fill the lower flow rate bins rapidly, and thus provided averaged data quickly. Although such data is of lower sensitivity, the invention allows the OBD algorithm to give a quick delivery of results. The accuracy of the more sensitive data in the higher flow rate bins is not compromised, thus sensitive data accumulates more slowly because it corresponds to higher engine speeds, but the value or quality thereof is not diluted.

In practice several sets of data bins are provided, one for each measured parameter. In the particle filter OBD, the most suitable parameters are differential pressure across the particle filter, flow rate through the particle filter, and dynamic head.

As soon as one trigger limit of one parameter is reached, which may be the trigger limit of one bin recording volumetric flow data, the average value of each corresponding bins of the other parameters is calculated.

In the example of a particle filter, three averaged values are thus provided, one each for differential pressure, flow rate and dynamic head. One of these averaged values is at the trigger limit of the corresponding data bin.

The three average values are used in the OBD to diagnose the condition of the particle filter. The OBD is not itself part of the present invention, but may incorporate the averaging technique disclosed herein as applied to concurrent recording of data in several data bins.

Thus the invention is able to provide measurements for use in a particle filter OBD, which measurements better represent actual conditions within the particle filter. As a consequence decisions made according to the OBD are more reliable, and false indications of fault can be reduced whilst also providing that faulty particle filters are not diagnosed by the OBD as normal.

As applied to a rotating shaft, the diagnostic may distinguish data according to speed of shaft rotation, which is an easily measured parameter. Where the shaft speed is variable, as in a vehicle application, lower speed data may accumulate more rapidly, but may be of lower quality if influenced by other sources of vibration having similar frequencies and/or amplitude. On the other hand high speed data may be of higher quality, but accumulate less quickly. The diagnostic of the invention permits a rapid decision by collecting all data across a range of shaft speeds, but applying different criteria to the data associated with a particular speed range. The data may be considered to be filtered into successive accumulators for a plurality of shaft speeds so that for example high speed data, in which an out of balance element may be more significant may be considered to have high confidence; thus fewer data points are required to give a reliable result.

In a second embodiment raw data is segregated according to a threshold, and passed through a digital filter associated with a respective threshold in order to produce an output for use in the diagnostic. Thus a plurality of digital filters is provided, each giving an output according to data separated by a series of thresholds. The advantages of separating frequent low quality data from infrequent high quality data are realized, thus permitting rapid delivery of a result for an OBD.

Aspects of the invention will be apparent from the numbered paragraphs that follow:

1. A method of determining the condition of a component by period diagnostic check, said diagnostic check indicating behaviour corresponding to 'normal' and 'fault' by reference to one or more pre-determined values, the method comprising:
   providing a numerical scale of possible values for each of one or more variable parameters of a component, said values have progressively increasing quality from one end of said scale to the other end;
   defining in each said scale a plurality of successive thresholds or filters, and providing for each threshold or filter a virtual data bin;
   continually measuring said one or more variable parameters at a pre-determined time interval to obtain successive values of said parameters;
   for each successive value, placing the value in every corresponding data bin having a threshold or filter on the lower quality side of said value;
   continually summing the values in respective data bins;
   defining for every data bin a trigger limit corresponding to a maximum sum of values;
   upon reaching the trigger limit in any bin, calculating the average value in said bin;
   using said average value in said diagnostic check by reference to said pre-determined value, and
   clearing the bin in which the trigger limit was reached for re-accumulation of successive values.

2. A method according to aspect 1, and used to determine the condition of an exhaust particle filter in the exhaust of an internal combustion engine, wherein a variable parameter is differential pressure between the inlet and outlet of said particle filter.

3. A method according to aspect 1, and used to determine the condition of an exhaust particle filter in the exhaust of an internal combustion engine, wherein a variable parameter is dynamic head between the inlet and outlet of the particle filter.

4. A method according to aspect 1, and used to determine the condition of an exhaust particle filter in the exhaust of an internal combustion engine, wherein a variable parameter is volume flow through said particle filter.

5. A method according to aspect 4, wherein an average value of volume flow determines a trigger limit for a data bin of values of differential pressure.

6. A method according to aspect 1, wherein upon reaching the trigger limit in any bin, the average value is calculated in all corresponding bins of all said variable parameters.

7. A method according to aspect 1, wherein the number of virtual data bins associated with each variable parameter is more than 3 and less than 20.

8. A method according to aspect 7, wherein the number of virtual data bins is the same for each variable parameter.

9. A method according to aspect 1, wherein a data bin at the upper end of a scale is defined by a lower threshold or filter only.

10. A method according to aspect 1, wherein a data bin at the lower end of a scale is defined by an upper threshold or filter only.

11. A method of determining the condition of a component by period diagnostic check, said diagnostic check indicating behaviour corresponding to 'normal' and 'fault' by reference to one or more pre-determined values, the method comprising:
    providing a numerical scale of possible values for each of one or more variable parameters of a component, said values have progressively increasing quality from one end of said scale to the other end;
    defining in each said scale a plurality of successive thresholds, and providing for each threshold a digital filter;
    continually measuring said one or more variable parameters at a pre-determined time interval to obtain successive values of said parameters;
    for each successive value, passing the value through the digital filter having a threshold on the lower quality side of said value;
    and using the output of said digital filter in said diagnostic check by reference to said pre-determined value.

12. A method according to aspect 11, and used to determine the condition of an exhaust particle filter in the exhaust of an internal combustion engine, wherein a variable parameter is differential pressure between the inlet and outlet of said particle filter.

13. A method according to aspect 11, and used to determine the condition of an exhaust particle filter in the exhaust of an internal combustion engine, wherein a variable parameter is dynamic head between the inlet and outlet of the particle filter.

14. A method according to aspect 11, and used to determine the condition of an exhaust particle filter in the exhaust of an internal combustion engine, wherein a variable parameter is volume flow through said particle filter.

15. A method according to aspect 11, wherein the number of digital filters associated with each variable parameter is more than 3 and less than 20.

16. A method according to aspect 11, wherein the number of digital filters is the same for each variable parameter.

17. An on-board diagnostic or processor for a component, and for implementing the method of aspect 1 or aspect 11.

18. An on-board diagnostic or processor according to aspect 17 wherein said component is a vehicle exhaust particle filter.

19. A control system of a vehicle, said control system comprising the diagnostic or processor of aspect 13.

20. A vehicle system comprising a component and an on-board diagnostic for implementing the method of aspect 1 or aspect 11, said diagnostic being incorporated within a control system for the component and comprising an electronic processor and one or more memory devices.

21. A vehicle system according to aspect 20 wherein said component is an exhaust particle filter.

22. The system of aspect 21, further including one or more of a pressure sensor upstream of said particle filter, a pressure sensor downstream of said particle filter, and a volumetric flow sensor in said exhaust system.

23. The system of aspect 21 or aspect 22, wherein said particle filter is one of a diesel particle filter and a gasoline particle filter.

24. A vehicle incorporating a control system according to aspect 19.
25. A vehicle incorporating a vehicle system according to aspect 20.

The invention claimed is:

1. A method of performing a periodic diagnostic check on an exhaust particle filter in the exhaust of an internal combustion engine to detect a fault with the exhaust particle filter, the method comprising:
   defining, for each of one or more variable parameters of the exhaust particle filter, a plurality of thresholds of successively increasing value, each threshold corresponding to a data bin, each data bin having a trigger limit corresponding to a maximum sum of values placed in the data bin;
   continually measuring said one or more variable parameters at a pre-determined time interval to obtain successive values of said parameters;
   placing each obtained value in every data bin having a corresponding threshold that is lower than said value;
   for each data bin, continually summing the values placed in the data bin to determine a sum of the values placed in the data bin;
   for each data bin, when the sum of the values placed in the data bin reaches the trigger limit of the data bin, calculating an average value in the data bin;
   testing said average value against a pre-determined value indicative of a fault with the exhaust particle filter to determine if the average value is indicative of the fault with the exhaust particle filter;
   outputting an alert to a vehicle driver in response to determining that the average value is indicative of the fault with the exhaust particle filter; and
   clearing the data bin in which the trigger limit was reached for re-accumulation of successive values.

2. A method according to claim 1, wherein one of the variable parameters is a differential pressure between an inlet and an outlet of said exhaust particle filter.

3. A method according to claim 1, wherein one of the variable parameters is a dynamic head between an inlet and outlet of the exhaust particle filter.

4. A method according to claim 1, wherein one of the variable parameters is a volume flow through said exhaust particle filter.

5. A method according to claim 4, comprising determining, for a data bin of values of differential pressure, a trigger limit corresponding to a maximum sum of values of differential pressure placed in the data bin based, at least in part, on an average value of volume flow.

6. A method according to claim 1, wherein upon reaching the trigger limit in any bin, the average value is calculated in all data bins of all said variable parameters.

7. A method according to claim 1, wherein a number of the data bins associated with each variable parameter is more than 3 and less than 20.

8. A method according to claim 7, wherein the number of the data bins is the same for each variable parameter.

9. A method according to claim 1, wherein a data bin at an upper end of a scale is defined by a lower threshold only.

10. A method according to claim 1, wherein a data bin at a lower end of a scale is defined by an upper threshold only.

11. A method of performing a periodic diagnostic check on an exhaust particle filter in the exhaust of an internal combustion engine to detect a fault with the exhaust particle filter, the method comprising:
    defining, for each of one or more variable parameters of the exhaust particle filter, a plurality of thresholds of successively increasing value, each threshold corresponding to a digital filter;
    continually measuring said one or more variable parameters at a pre-determined time interval to obtain successive values of said parameters;
    for each successive value, passing the value through one or more of the digital filters having a corresponding threshold lower than said value;
    testing an output of said digital filter against a pre-determined value indicative of a fault with the exhaust particle filter to determine if the output of said digital filter is indicative of the fault with the exhaust particle filter, and
    outputting an alert to a vehicle driver in response to determining that the output of said digital filter is indicative of the fault with the exhaust particle filter.

12. A method according to claim 11, wherein one of the variable parameters is a differential pressure between an inlet and an outlet of said exhaust particle filter.

13. A method according to claim 11, wherein one of the variable parameters is a dynamic head between an inlet and an outlet of the exhaust particle filter.

14. A method according to claim 11, wherein one of the variable parameters is a volume flow through said exhaust particle filter.

15. A method according to claim 11, wherein a number of the digital filters associated with each variable parameter is more than 3 and less than 20.

16. A method according to claim 11, wherein the number of the digital filters is the same for each variable parameter.

17. An on-board diagnostic or processor for a component that is configured for implementing the method of claim 1.

18. A control system of a vehicle, said control system comprising the diagnostic or processor of claim 17.

19. A vehicle system comprising an exhaust particle filter in the exhaust of an internal combustion engine and an on-board diagnostic that is configured for implementing the method of claim 1, said diagnostic being incorporated within a control system for the exhaust particle filter and comprising an electronic processor and one or more memory devices.

20. The vehicle system of claim 19, further including one or more of a pressure sensor upstream of said exhaust particle filter, a pressure sensor downstream of said exhaust particle filter, and a volumetric flow sensor in said exhaust system.

21. The vehicle system of claim 19, wherein said exhaust particle filter is one of a diesel particle filter and a gasoline particle filter.

22. A vehicle incorporating a control system according to claim 18.

23. A method according to claim 11, wherein each successive value is passed through every digital filter having a corresponding threshold that is less than said value.

* * * * *